Nov. 2, 1948.                     E. E. WHITE                      2,452,706
                              ROCK SHEARING MACHINE
Filed Aug. 5, 1947                                          2 Sheets-Sheet 1
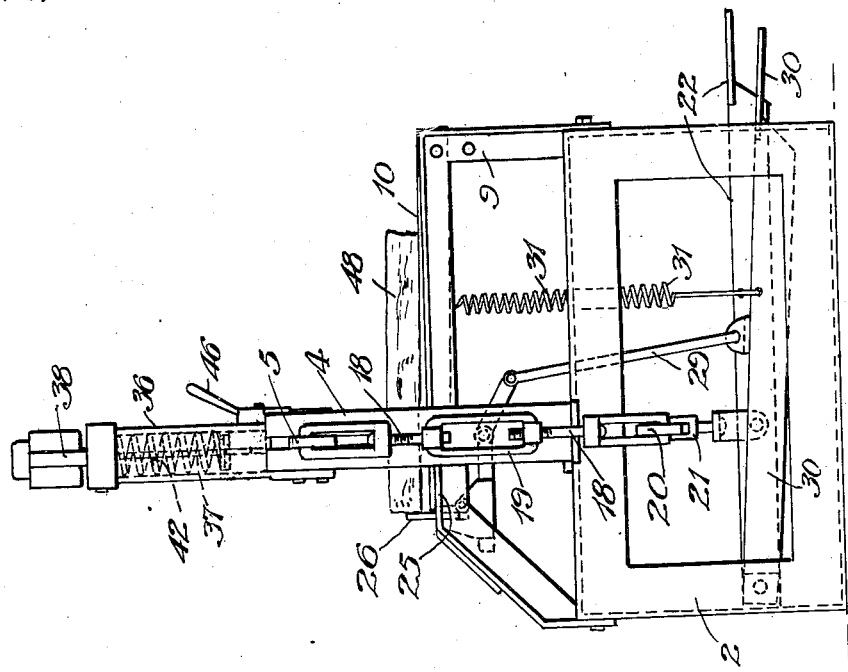
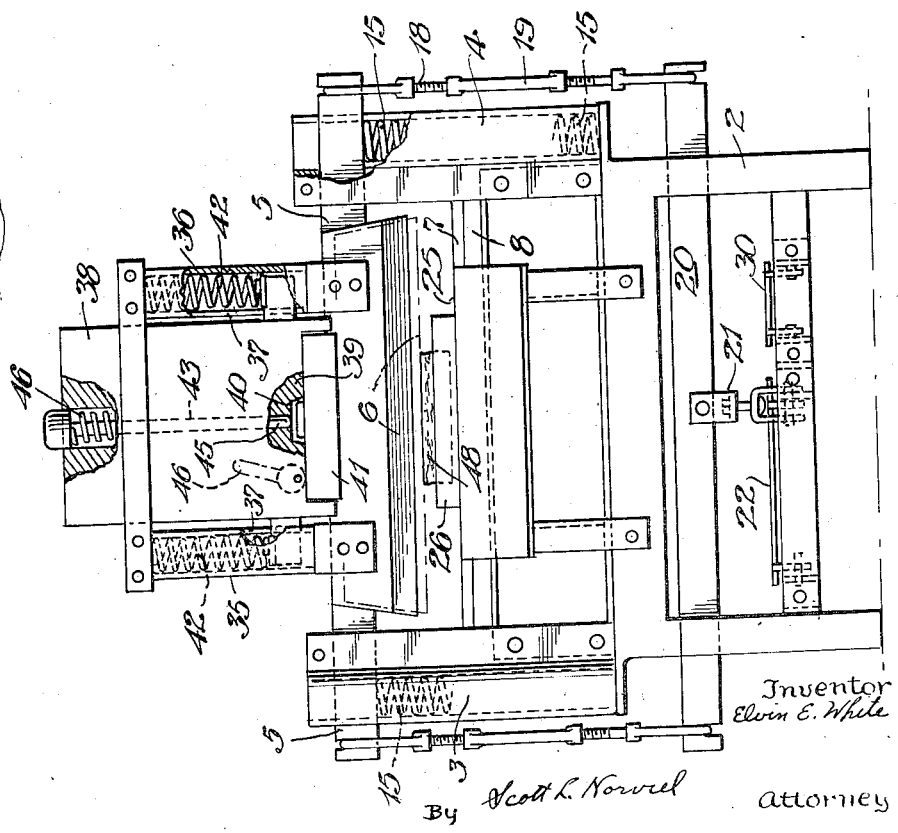
Inventor
Elvin E. White
By Scott L. Norvell
Attorney

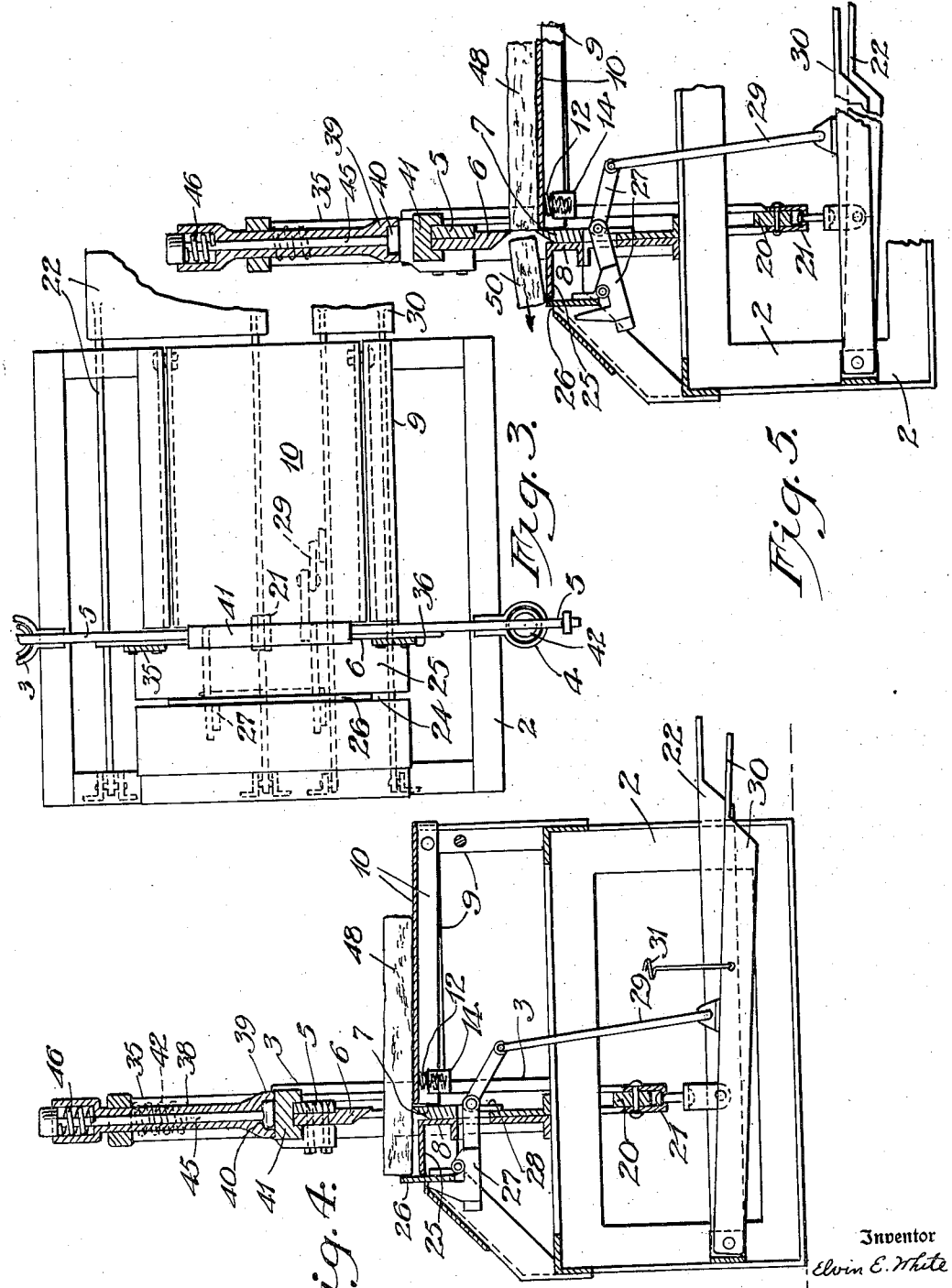

Patented Nov. 2, 1948

2,452,706

UNITED STATES PATENT OFFICE 2,452,706

ROCK SHEARING MACHINE

Elvin E. White, Tempe, Ariz.

Application August 5, 1947, Serial No. 766,282

4 Claims. (Cl. 125—23)

This invention relates to rock shear machines of the type adapted to shear slabs or plates of stratified rocks along straight lines.

In certain geologic formations there are sand stones and tuffacious rocks which are seamed horizontally so that they can be quarried in slabs and split along the horizontal seams to comparatively uniform thickness.

The quarried slabs can then be sheared and cut into strips of convenient width and these strips again cut into convenient lengths for building walls, being laid up in a style commonly called "random courses."

Heretofore various means and devices have been tried to cut or break these slabs to secure a uniform and flat sheared face, however, all such means have their limitations and cannot be effectively applied to the cutting of rock slabs of the types above mentioned and herein concerned.

The primary object of this invention is to provide a shearing machine which will conveniently position and handle rock slabs and subject them to a primary shearing tension between the blades and while so held will further subject the rock to a sharp shearing blow by the tensioned blades so that the rock is sheared or cracked across the grain and following a straight line.

Other objects of the invention include the provision of a mechanism for efficiently handling rock slabs and positioning them between the blades of the shear mechanism above mentioned;

Another object is to provide means for handling the rock within the shear so that it does not contact or hang up on the lower blade when being moved into position;

Another object is to provide mechanism operative in conjunction with the shear for measuring and holding rock slabs predetermined distances from the shear blades so that strips or blocks of determined width may be cut;

Another object is to provide a pair of vertically operative shear blades having means for mutual movement to place the slab to be cut under shear tension, with one of the blades horizontally adjustable to permit it to adjust its edge to the face of the slab whether the two faces are parallel or not;

A further object is to provide a slab shear wherein the blades are placed under shear stress and then given a sudden quick cleaving motion by means of a propulsive mechanism operative by means of a percussive explosive charge, arranged so that the force of the explosion is transmitted through the shear blades while in tension to the face of the rock slab to be cracked;

A still further object is to provide mechanism including a pair of vertically operative shear blades, between which rock slabs may be placed for shearing, with stop mechanism including an upwardly extending plate against which rock to be cut may be positioned a determined distance away from said blades, and mechanism for mounting said stop plate so that it moves out of the way, and below the lower face of rock held between said blades when not in operative position;

A still further object is to provide a mechanism as above described with means whereby an explosive charge may be used to communicate a sharp blow to the shear blades to obtain the necessary fracturing action.

Other objects will appear hereinafter.

I attain the foregoing objects by means of the devices and construction shown in the accompanying drawings, in which Figure 1 is a side elevation of my device;

Figure 2, a front view thereof;

Figure 3, a plan view thereof;

Figure 4, a side sectional elevation with the shear blades in open position; and Figure 5, a side sectional elevation with the shear blades in tensioned position.

Similar numerals refer to similar parts in the several views.

Upon the base 2 of the machine there are two laterally positioned vertical tubular guides 3 and 4. These guide tubes are slotted to receive the transverse blade holder 5 which carries blade 6 in alined position above the bottom blade 7 which is bolted to a holder 8 attached to and extending between the lower portion of the guides.

A table frame 9 is attached to the base adjacent the front side of blade 7, with its upper members in a horizontal plane with the blade edge. A table top 10 is hinged to the table frame members 9 at their outer edges and its inner edge rests on a spring 12 attached to an inner transverse frame member 14. This normally holds the inner portion of the table above the edge of bottom blade 7.

Springs 15 positioned within guide members 3 and 4 hold blade holder 5 and all its attendant and attached parts in an elevated or raised position. Rods 18, adjustable by turnbuckles 19, are hooked into notches at the ends of holder 5 and link it to an evener bar 20 which operates in the base below the table structure. This is attached by a clevis 21 to a foot treadle 22 which projects beyond the inner side of base 2. Adjacent the outer side of the lower blade 7 there is a table 25 slightly below the edge of this blade. This table has a transverse slot 24 to admit the stop plate 26. This plate is hinged at the bottom to the outer end of rocker 27 which is pivotally supported in base 2 by brackets 28. The inner arm of this rocker is connected by rod 29 to left foot treadle 30. The stop plate is balanced to normally retract into slot 24, and the weight of the treadle 30 is counterbalanced by spring 31.

Two guides 35 and 36 are attached to and extend upward from blade holder 5. These guides have slots 37 on their adjacent inner faces. A heavy reaction plate 38 is slidably supported in these guides and is provided with a shoe 39 at the bottom having a cavity 40 on its bottom face. This shoe rests on an anvil 41 on the top edge of blade holder 5. Plate 38 is normally urged downward by light springs 42. It is made sufficiently heavy to have several times the mass of blade holder 5 and blade 6. A hole 43 is drilled vertically through the center of this plate and a firing pin 45 is inserted so that its lower tip enters cavity 40. A spring 46 normally holds the firing pin above the surface of anvil 41. The cavity 40 is designed to hold a small charge of percussive explosive, such as mercury fulminate.

In operation, a slab 48 is placed on table top 10. The operator stands at the inner side of the base and inserts it between the blades. Spring 12 holds the table top up so the slab slides forward without scraping on bottom blade 7. The operator presses down on treadle 30 and raises stop plate 26. The slab is pushed outward until its outer edge contacts the stop plate. The slab then being positioned, treadle 30 is released. The operator then presses down on treadle 22 and this brings the top blade 6 down on top of the slab and forces it downward onto the cutting edge of bottom blade 7. A shear stress is, in this way, impressed on the slab along the line of the blades. The inner pivotal support of table 10 is positioned so that when the blade 6 is brought down on slab 48 and spring 12 compressed, the lower face of the slab is at right angles to the shear plane of blades 6 and 7.

Plate 38 with its shoe 39 is then raised a short distance above the anvil 41 by using cam lever 46. A percussive explosive charge is placed on the anvil beneath cavity 40 and the plate 26 lowered so that shoe 39 rests on anvil 41. With the shear stress maintained, the operator strikes firing pin a light blow with a hammer. This explodes the charge forcing plate 26 upward and the top blade 6 downward onto the slab. The force of the explosion is very sharp and quick and the blades shear the slab cleanly along the line where their edges contact the slab. After the explosion springs 42 return the plate 26 to its position on anvil 41.

The block 50 sheared from slab 48 drops from the outer table 25 and the machine is ready for another cutting operation.

With certain types of rock, particularly heavy and thick sandstones, it may be advantageous to provide a series of chisel points which may be held under tension and then given a shearing blow, however this type of operation is to be distinguished from that here concerned. This machine is intended for use on comparatively thin slabs of tuffacious sandstones. The object of the operation is to provide a clean sheared surface free from irregularities, tool marks, crushed courses. I have found that if a blade, composed of a series of tooth points, is used the results are disappointing. Wherever the rock is held under shearing stress it shears smoothly and cleanly when the final blow is applied. Sections of the rock not under stress are separated, it is true, but the result is that of merely crushing, or crumbling, and chips may break out on either side of the line of shear, all of which spoils the appearance of the cut face. Rock of the type here concerned has horizontal faces normally so smooth that the blades bite through any slight irregularities, and, as shearing pressure is applied, bed themselves in the body of the rock sufficiently to provide a countinuous uninterrupted shear stress along the line of the cut desired. If there are unusual wavy irregularities through which the blades will not ordinarily bite the rock may be soaked in water for a short time. This softens the exterior faces so that the blades easily bed, as aforesaid. Aside from the foregoing, it is acknowledged that the planes of the horizontal faces of the slabs are not always truly parallel. This condition is met by the lateral, variable, downward pull on the ends of the blade holder 5 provided by the evener bar 20 through its centrally positioned clevis 21.

From the foregoing it will be understood that I have provided a device which for the special purposes intended is easily made and operated and efficiently operative. I am aware that there are other types of rock breakers and shearing devices, none of which, however, combine the features here shown to attain the results desired.

In view of this it is intended that the following claims be tendered a liberal construction.

I claim:

1. A rock shearing machine comprising a base, a fixed bottom blade thereon, a slab supporting table adjacent thereto having a spring support to resiliently support a slab thereon slightly above the edge of said blade, a top blade slidably supported on said base above said bottom blade, springs adapted to normally hold said top blade above said bottom blade, mechanism for drawing said top blade down upon the face of a rock slab positioned on said bottom blade, including links attached to said blade, an evener bar and a hold down treadle, and mechanism for administering a sharp downward blow to said top blade, including an anvil on said blade, a reactance plate slidably supported thereabove having a cavity to hold an explosive charge on said anvil, and a firing pin operative to discharge said charge.

2. A rock shearing machine comprising a base, a fixed bottom blade thereon, a slab supporting table adjacent thereto having a spring support to resiliently support a slab thereon slightly above the edge of said blade, a top blade slidably supported on said base above said bottom blade, springs adapted to normally hold said top blade above said bottom blade, mechanism for drawing said top blade down upon the face of a rock slab positioned on said bottom blade, including links attached to said blade, an evener bar and a hold down treadle, a slab stop including a retractable plate operative adjacent the outer face of said bottom blade, normally held in depressed retracted position and a treadle operatively attached thereto adapted to raise said stop plate above the level of said bottom blade edge, and mechanism for administering a sharp downward blow to said top blade, including an anvil on said blade, a reactance plate slidably supported thereabove having a cavity to hold an explosive charge on said anvil, and a firing pin operative to discharge said charge.

3. In a rock shearing machine of the type described, having a stationary lower blade and a movable blade vertically operative thereabove, means for bringing said blades into shear stress upon a rock slab placed therebetween and for administering a sharp shearing blow to the slab, while under said stress, means for supporting and positioning rock slabs between said blades including a table having a top hinged at the outer edge and resiliently supported at its inner edge adjacent said lower blade, by spring means of sufficient force to support the rock slab thereon and maintain its lower face clear of the edge of said lower blade until forced downward thereon by operation of said upper blade.

4. In a rock shearing machine of the type described, having a stationary lower blade and a movable blade vertically operative thereabove, means for bringing said blades into shear stress upon a rock slab placed therebetween and for administering a sharp shearing blow to the slab, while under said stress, means for supporting and positioning rock slabs between said blades including a table having a top hinged at the outer edge and resiliently supported at its inner edge adjacent said lower blade, by spring means of sufficient force to support the rock slab thereon and maintain its lower face clear of the edge of said lower blade until forced downward thereon by operation of said upper blade, and a table adjacent the outer face of said lower blade and below the edge thereof, together with a stop plate vertically operative in a slot therein adapted to extend upward therethrough parallel to and above said lower blade and mechanism for normally holding said plate in retracted position and for extending it by pedal operation.

ELVIN E. WHITE.

REFERENCES CITED

The following references are of record in the file of this patent:

UNITED STATES PATENTS

| Number | Name | Date |
|---|---|---|
| 957,747 | Clifton | May 10, 1910 |
| 1,397,911 | Tossizza | Nov. 22, 1921 |
| 2,149,641 | Temple | Mar. 7, 1939 |